(12) United States Patent
Wardley et al.

(10) Patent No.: US 7,958,033 B2
(45) Date of Patent: Jun. 7, 2011

(54) SYSTEMS AND METHODS FOR PROVIDING A LIQUIDITY-BASED COMMODITIES INDEX

(75) Inventors: Neil William Wardley, Chatham, NJ (US); Brian Scott Upbin, New York, NY (US)

(73) Assignee: Barclays Capital Inc., New York, NY (US)

( * ) Notice: Subject to any disclaimer, the term of this patent is extended or adjusted under 35 U.S.C. 154(b) by 648 days.

(21) Appl. No.: 11/847,890

(22) Filed: Aug. 30, 2007

(65) Prior Publication Data
US 2008/0059358 A1    Mar. 6, 2008

Related U.S. Application Data

(60) Provisional application No. 60/841,704, filed on Sep. 1, 2006.

(51) Int. Cl.
*G06Q 40/00* (2006.01)

(52) U.S. Cl. .......................... 705/35; 705/37

(58) Field of Classification Search .............. 705/35, 705/36 R, 37
See application file for complete search history.

(56) References Cited

U.S. PATENT DOCUMENTS

| | | | |
|---|---|---|---|
| 2001/0027437 A1* | 10/2001 | Turbeville et al. | 705/38 |
| 2001/0034687 A1* | 10/2001 | Bushonville et al. | 705/37 |
| 2001/0034688 A1* | 10/2001 | Annunziata | 705/37 |
| 2002/0026403 A1* | 2/2002 | Tambay et al. | 705/37 |
| 2002/0029183 A1* | 3/2002 | Vlahoplus et al. | 705/37 |
| 2002/0194107 A1* | 12/2002 | Li et al. | 705/37 |
| 2003/0074304 A1* | 4/2003 | Okada | 705/37 |
| 2004/0006502 A1* | 1/2004 | Masiello et al. | 705/8 |
| 2004/0162776 A1* | 8/2004 | Vrabel | 705/37 |
| 2005/0108138 A1* | 5/2005 | Sperandeo | 705/36 |
| 2005/0114252 A1* | 5/2005 | Beurskens | 705/37 |
| 2005/0131794 A1* | 6/2005 | Lifson | 705/36 |
| 2005/0273419 A1* | 12/2005 | Ogg et al. | 705/37 |
| 2006/0047600 A1* | 3/2006 | Bodenheim et al. | 705/40 |
| 2006/0212384 A1* | 9/2006 | Spurgin et al. | 705/37 |

* cited by examiner

*Primary Examiner* — James P Trammell
(74) *Attorney, Agent, or Firm* — Morgan Lewis & Bockius LLP

(57) ABSTRACT

Systems and methods are provided for a liquidity-based commodity index in which historical liquidity-related data for a commodity is used to determine whether to include a commodity in an index and also used to weight commodities in the index. Liquidity of a commodity is calculated based on an average daily dollar value of contracts traded for the commodity. The commodity liquidity is compared to a liquidity threshold to determine that the commodity should be included in the index. A liquidity factor is calculated for each commodity included in the index and is also used to weight the commodity in the index.

24 Claims, 14 Drawing Sheets

LBCI Eligible Commodities and Contracts for 2006

| Commodity | Contract Used in LBCI | Exchange | Ticker | $ Denominated Futures Contracts Not Currently Eligible for LBCI |
|---|---|---|---|---|
| Crude Oil | West Texas Intermediate | NYMEX | CL | Brent Crude (IPE) |
| Heating Oil | Heating Oil | NYMEX | HO | Gasoil (IPE) |
| Natural Gas | Henry Hub | NYMEX | NG | |
| Unleaded Gas | RBOB | NYMEX | XB | HU RFG (used prior to July 1, 2006) |
| Aluminum | High Grade Aluminum (London) | LME | LA | Alloy (LME), Aluminum (COMEX) |
| Copper | Copper (London) | LME | LP | Copper (COMEX) |
| Nickel | Primary Nickel (London) | LME | LN | |
| Zinc | High Grade Zinc (London) | LME | LX | |
| Gold | Gold (New York) | COMEX | GC | Gold (CBOT) |
| Silver | Silver (New York) | COMEX | SI | Silver (CBOT) |
| Lean Hogs | Lean Hogs | CME | LH | |
| Live Cattle | Live Cattle | CME | LC | |
| Corn | Corn | CBOT | C | |
| Soybean | Soybean | CBOT | S | |
| Soybean Meal | Soybean Meal | CBOT | SM | |
| Soybean Oil | Soybean Oil | CBOT | BO | |
| Wheat | Wheat (Chicago) | CBOT | W | Kansas (KCBOT), Minneapolis (MGE) |
| Coffee | Coffee 'C' | NYBOT | KC | Arabica (BMF), Robusta (LIFFE) |
| Cotton | Cotton No. 2 | NYBOT | CT | |
| Sugar | Sugar No. 11 | NYBOT | SB | Sugar No. 14 (NYBOT) |

FIG. 2

LBCI Weights Since 2001   300   310   320

| Sector & Commodity Selection | | | Initial Annual LBCI Weights | | | | | | |
|---|---|---|---|---|---|---|---|---|---|
| Sector/Commodity | Contract | Exch. | Jul 1, 2006 | 2006 | 2005 | 2004 | 2003 | 2002 | 2001 |
| Energy | | | 51.02% | 56.17% | 52.12% | 51.21% | 50.77% | 46.81% | 40.31% |
| Crude Oil | West Texas Intermediate | NYM | 27.48% | 26.65% | 23.49% | 22.19% | 22.38% | 20.81% | 17.67% |
| Natural Gas | Henry Hub Natural Gas | NYM | 7.98% | 14.63% | 15.06% | 15.91% | 15.27% | 13.74% | 11.99% |
| Unleaded Gas | NY Harbor/RBOB (a) | NYM | 8.13% | 7.54% | 7.05% | 6.84% | 6.79% | 6.27% | 5.38% |
| Heating Oil | No. 2 Heating Oil NY | NYM | 7.43% | 7.35% | 6.52% | 6.28% | 6.33% | 5.99% | 5.28% |
| Metals | | | 30.10% | 22.77% | 24.47% | 25.24% | 26.19% | 28.92% | 32.13% |
| Industrial Metals | | | 20.11% | 14.12% | 16.08% | 18.12% | 20.25% | 22.19% | 23.84% |
| Aluminum | High Grade Primary Aluminum | LME | 4.54% | 4.29% | 6.11% | 8.10% | 9.12% | 9.65% | 9.94% |
| Copper | Copper - Grade A | LME | 10.50% | 6.68% | 6.78% | 6.95% | 7.52% | 8.25% | 8.71% |
| Nickel | Primary Nickel | LME | 2.23% | 1.55% | 1.58% | 1.48% | 1.83% | 2.21% | 2.70% |
| Zinc | Special High Grade Zinc | LME | 2.83% | 1.60% | 1.60% | 1.59% | 1.78% | 2.09% | 2.49% |
| Precious Metals | | | 10.00% | 8.64% | 8.40% | 7.11% | 5.94% | 6.73% | 8.29% |
| Gold | Gold | CMX | 7.65% | 6.83% | 6.70% | 5.67% | 4.49% | 4.88% | 5.83% |
| Silver | Silver | CMX | 2.34% | 1.81% | 1.70% | 1.44% | 1.45% | 1.85% | 2.46% |
| Agricultural | | | 16.54% | 18.22% | 20.55% | 20.35% | 19.75% | 20.66% | 23.97% |
| Grains | | | 13.40% | 14.62% | 17.17% | 17.01% | 16.17% | 16.30% | 18.36% |
| Soybeans | Soybeans | CBT | 5.76% | 6.88% | 7.89% | 7.31% | 6.59% | 6.73% | 7.88% |
| Corn | Corn | CBT | 3.24% | 3.06% | 3.66% | 3.83% | 3.98% | 3.98% | 4.34% |
| Soybean Meal | Soybean Meal | CBT | 1.48% | 1.86% | 2.30% | 2.38% | 2.30% | 2.28% | 2.37% |
| Wheat | Chicago | CBT | 1.73% | 1.60% | 1.86% | 2.03% | 2.02% | 2.00% | 2.04% |
| Soybean Oil | Soybean Oil | CBT | 1.18% | 1.21% | 1.47% | 1.45% | 1.28% | 1.31% | 1.73% |
| Softs | | | 3.14% | 3.61% | 3.38% | 3.34% | 3.58% | 4.36% | 5.61% |
| Coffee | Coffee "C" | NYBOT | 1.16% | 1.43% | 1.27% | 1.15% | 1.30% | 1.76% | 2.31% |
| Cotton | Cotton #2 | NYBOT | 0.95% | 1.11% | 1.20% | 1.27% | 1.28% | 1.53% | 2.08% |
| Sugar | World Sugar #11 | NYBOT | 1.03% | 1.06% | 0.90% | 0.92% | 1.00% | 1.07% | 1.22% |
| Livestock | | | 2.34% | 2.84% | 2.86% | 3.21% | 3.30% | 3.60% | 3.59% |
| Live Cattle | Live Cattle | CME | 1.43% | 1.88% | 1.99% | 2.35% | 2.33% | 2.49% | 2.48% |
| Lean Hogs | Lean Hogs | CME | 0.91% | 0.96% | 0.87% | 0.86% | 0.97% | 1.11% | 1.11% |
| | | Total | 100% | 100% | 100% | 100% | 100% | 100% | 100% |

FIG. 3

LBCI 2006 Active Contract Calendar 500

| Commodity | Contract | Exchange | Ticker | Jan (F) | Feb (G) | Mar (H) | Apr (J) | May (K) | June (M) | July (N) | Aug (Q) | Sep (U) | Oct (V) | Nov (X) | Dec (Z) | Excluded Contracts |
|---|---|---|---|---|---|---|---|---|---|---|---|---|---|---|---|---|
| Crude Oil | West Texas Intermediate | NYMEX | CL | G/H | H/J | J/K | K/M | M/N | N/Q | Q/U | U/V | V/X | X/Z | Z/F | F/G | |
| Heating Oil | Heating Oil | NYMEX | HO | G/H | H/J | J/K | K/M | M/N | N/Q | Q/U | U/V | V/X | X/Z | Z/F | F/G | |
| Natural Gas | Henry Hub | NYMEX | NG | G/H | H/J | J/K | K/M | M/N | N/Q | Q/U | U/V | V/X | X/Z | Z/F | F/G | |
| Unleaded Gas | NYH RBOB | NYMEX | XB | G/H | H/J | J/K | K/M | M/N | N/Q | Q/U | U/V | V/X | X/Z | Z/F | F/G | |
| Aluminum | High Grade Aluminum | LME | LA | G/H | H/J | J/K | K/M | M/N | N/Q | Q/U | U/V | V/X | X/Z | Z/F | F/G | |
| Copper | Copper | LME | LP | G/H | H/J | J/K | K/M | M/N | N/Q | Q/U | U/V | V/X | X/Z | Z/F | F/G | |
| Nickel | Primary Nickel | LME | LN | G/H | H/J | J/K | K/M | M/N | N/Q | Q/U | U/V | V/X | X/Z | Z/F | F/G | |
| Zinc | High Grade Zinc | LME | LX | G/H | H/J | J/K | K/M | M/N | N/Q | Q/U | U/V | V/X | X/Z | Z/F | F/G | |
| Gold | Gold (New York) | COMEX | GC | G/J | J | J/M | M | M/Q | Q | Q/Z | Z | Z | Z | Z/G | G | V |
| Silver | Silver (New York) | COMEX | SI | H | H/K | K | K/N | N | N/U | U | U/Z | Z | Z | Z/H | H | F |
| Lean Hogs | Lean Hogs | CME | LH | G/J | J | J/M | M | M/N | N/Q | Q/V | V | V/Z | Z | Z/G | G | K |
| Live Cattle | Live Cattle | CME | LC | G/J | J | J/M | M | M/Q | Q | Q/V | V | V/Z | Z | Z/G | G | K, N |
| Corn | Corn | CBOT | C | H | H/K | K | K/N | N | N/U | U | U/Z | Z | Z | Z/H | H | |
| Soybean | Soybean | CBOT | S | H | H/K | K | K/N | N | N/X | X | X | X | X/F | F | F/H | Q, U |
| Soybean Meal | Soybean Meal | CBOT | SM | H | H/K | K | K/N | N | N/Z | Z | Z | Z | Z/F | F | F/H | V, Q |
| Soybean Oil | Soybean Oil | CBOT | BO | H | H/K | K | K/N | N | N/Z | Z | Z | Z | Z/F | F | F/H | V, Q |
| Wheat (Chicago) | Wheat (Chicago) | CBOT | W | H | H/K | K | K/N | N | N/U | U | U/Z | Z | Z | Z/H | H | |
| Coffee | Coffee 'C' | NYBOT | KC | H | H/K | K | K/N | N | N/U | X | X | X | X/F | F | F/H | V |
| Cotton | Cotton No. 2 | NYBOT | CT | H | H/K | K | K/N | N | N/Z | Z | Z | Z | Z/F | F | F/H | |
| Sugar | Sugar No. 11 | NYBOT | SB | H | H/K | K | K/N | N | N/V | V | V | V/H | H | H | H | |

FIG. 5

Soybean Meal Daily Spot & Excess Returns (April 2006 Roll Period)

| Business Day | Calendar Day | May (K) 2006 Contract Closing Price | July (N) 2006 Contract Closing Price | Roll Weight (%Current/%Next) | Price$_t$ w/ Roll Weight | Price$_{t-1}$ w/ Roll Weight | Daily Spot Return | Daily Excess Return | Daily Roll Yield |
|---|---|---|---|---|---|---|---|---|---|
| 5th | 4/7/06 | 171.1 | 173.4 | 100K | 171.1 | 172.7 | -0.93% | -0.93% | 0.00% |
| 6th | 4/10/06 | 168.4 | 171 | 80K/20N | 168.92 | 171.56 | -1.27% | -1.54% | -0.27% |
| 7th | 4/11/06 | 171.2 | 173.5 | 60K/40N | 172.12 | 169.44 | 1.89% | 1.58% | -0.31% |
| 8th | 4/12/06 | 171.9 | 173.6 | 40K/60N | 172.92 | 172.58 | 0.46% | 0.20% | -0.26% |
| 9th | 4/13/06 | 173.4 | 175.1 | 20K/80N | 174.76 | 173.26 | 1.06% | 0.87% | -0.19% |
| 10th | 4/17/06 | 177.5 | 178.4 | 100N | 178.4 | 175.1 | 2.08% | 1.88% | -0.20% |

Soybean Meal Total Returns During April 2006 Roll Period

| Business Day | Calendar Day | Most Recent Auction Date at Start of Day | Current 13-Week T-Bill High Rate | Calendar Days since Last LBCI Day | T-Bill Daily Return | Soybean Meal Daily ER | Soybean Meal Daily TR |
|---|---|---|---|---|---|---|---|
| 5th | 4/7/06 | 4/3/06 | 4.535 | 1 | 0.01% | -0.93% | -0.91% |
| 6th | 4/10/06 | 4/3/06 | 4.535 | 3 | 0.04% | -1.54% | -1.50% |
| 7th | 4/11/06 | 4/10/06 | 4.57 | 1 | 0.01% | 1.58% | 1.59% |
| 8th | 4/12/06 | 4/10/06 | 4.57 | 1 | 0.01% | 0.20% | 0.21% |
| 9th | 4/13/06 | 4/10/06 | 4.57 | 1 | 0.01% | 0.87% | 0.88% |
| 10th | 4/17/06 | 4/10/06 | 4.57 | 4 | 0.05% | 1.88% | 1.94% |

FIG. 7

Calculations of 2005 and 2006 Commodity Liquidity Factors

| Commodity | Contract | Exch. | 3-Year Trailing Avg. Daily Liquidity ($000) 11/30/2004 | Closing Price 2nd LBCI Day 1/5/2005 | Liquidity Factor 2005 | 3-Year Avg. Daily Liquidity ($000) 11/30/2005 | Closing Price 2nd LBCI Day 1/5/2006 | Liquidity Factor 2006 |
|---|---|---|---|---|---|---|---|---|
| Energy | | | | | | | | |
| Crude Oil | WTI | NYMEX | 6,150,749 | 43.91 | 140,076 | 9,081,146 | 63.42 | 143.91 |
| Natural Gas | Henry Hub | NYMEX | 3,942,584 | 5.902 | 668,008 | 4,986,028 | 10.197 | 488,970 |
| Unleaded Gas | RFG/RBOB | NYMEX | 1,847,265 | 117.21 | 15,760 | 2,568,232 | 178.45 | 14,932 |
| Heating Oil | Heating Oil | NYMEX | 1,707,624 | 124.66 | 13,698 | 2,503,217 | 181.77 | 13,771 |
| Metals | | | | | | | | |
| Aluminum | High Grade Aluminum | LME | 1,601,093 | 1,809.25 | 884.9485 | 1,463,346 | 2,307.00 | 634.3071 |
| Copper | Copper | LME | 1,775,519 | 2,962.00 | 599.4323 | 2,275,490 | 4,634.50 | 490.9894 |
| Zinc | High Grade Zinc | LME | 418,998 | 1,169.00 | 358.4245 | 545,524 | 1,945.00 | 280.475 |
| Nickel | Primary Nickel | LME | 414,183 | 14,220.00 | 29.12681 | 527,413 | 14,060.00 | 37.51156 |
| Gold | Gold (New York) | COMEX | 1,753,661 | 429.2 | 4,086 | 2,328,350 | 535.6 | 4,347 |
| Silver | Silver (New York) | COMEX | 445,414 | 6.452 | 69,035 | 617,169 | 9.17 | 67,303 |
| Agriculture | | | | | | | | |
| Soybean | Soybean | CBOT | 2,065,749 | 525 | 3,935 | 2,343,227 | 632.25 | 3,706 |
| Corn | Corn | CBOT | 959,463 | 201 | 4,773 | 1,044,031 | 218.25 | 4,784 |
| Soybean Meal | Soybean Meal | CBOT | 601,397 | 155.9 | 3,858 | 635,163 | 196.9 | 3,226 |
| Wheat | Wheat (Chicago) | CBOT | 486,589 | 296 | 1,644 | 545,972 | 346.25 | 1,577 |
| Soybean Oil | Soybean Oil | CBOT | 383,675 | 19.97 | 19,213 | 411,384 | 23.6 | 17,432 |
| Coffee | Coffee 'C' | NYBOT | 333,163 | 101.45 | 3,284 | 485,995 | 110.65 | 4,392 |
| Cotton | Cotton No. 2 | NYBOT | 315,153 | 44.49 | 7,084 | 379,788 | 54.94 | 6,913 |
| Sugar | Sugar No. 11 | NYBOT | 235,970 | 9.03 | 23,132 | 362,737 | 14.87 | 24,394 |
| Livestock | | | | | | | | |
| Live Cattle | Lean Hogs | CME | 519,849 | 90.475 | 5,746 | 640,268 | 96.475 | 6,637 |
| Lean Hogs | Live Cattle | CME | 227,827 | 76.5 | 2,978 | 327,540 | 64.05 | 5,114 |

FIG. 8

Annual Index Rebalancing: 2006 Index Liquidity Factor Roll

900

| | LBCI Bus Day 2006 Cal. Date | | 2005 Liquidity Factor is Used | | | | | Weighted 2005/2006 LF | | | | | 2006 LF Used | | |
|---|---|---|---|---|---|---|---|---|---|---|---|---|---|---|---|
| | | | 1 Jan 3 | 2 Jan 4 | 3 Jan 5 | 4 Jan 6 | 5 Jan 9 | 6 Jan 10 | 7 Jan 11 | 8 Jan 12 | 9 Jan 13 | Holid Jan 16 | 10 Jan 17 | 11 Jan 18 |
| Energy | | | | | | | | | | | | | | |
| Crude Oil | WTI | NYMEX | 140,076 | 140,076 | 140,076 | 140,076 | 140,076 | 140,699 | 141,322 | 141,945 | 142,568 | 142,568 | 143,191 | 143,191 |
| Natural Gas | Henry Hub | NYMEX | 668,008 | 668,008 | 668,008 | 668,008 | 668,008 | 632,201 | 596,393 | 560,585 | 524,778 | 524,778 | 488,970 | 488,970 |
| Unleaded Gas | NYH (a) | NYMEX | 15,760 | 15,760 | 15,760 | 15,760 | 15,760 | 15,487 | 15,213 | 14,939 | 14,666 | 14,666 | 14,392 | 14,395 |
| Heating Oil | Heating Oil | NYMEX | 13,698 | 13,698 | 13,698 | 13,698 | 13,698 | 13,713 | 13,727 | 13,742 | 13,757 | 13,757 | 13,771 | 13,771 |
| Metals | | | | | | | | | | | | | | |
| Aluminum | HG Aluminum | LME | 885 | 885 | 885 | 885 | 885 | 835 | 785 | 735 | 684 | 684 | 634 | 634 |
| Copper | Copper | LME | 599 | 599 | 599 | 599 | 599 | 578 | 556 | 534 | 513 | 513 | 491 | 491 |
| Zinc | High Grade Zinc | LME | 358 | 358 | 358 | 358 | 358 | 343 | 327 | 312 | 296 | 296 | 280 | 280 |
| Nickel | Primary Nickel | LME | 29 | 29 | 29 | 29 | 29 | 31 | 32 | 34 | 36 | 36 | 38 | 38 |
| Gold | Gold | COMEX | 4,086 | 4,086 | 4,086 | 4,086 | 4,086 | 4,138 | 4,190 | 4,243 | 4,295 | 4,295 | 4,347 | 4,347 |
| Silver | Silver | COMEX | 69,035 | 69,035 | 69,035 | 69,035 | 69,035 | 68,689 | 68,342 | 67,996 | 67,649 | 67,649 | 67,303 | 67,303 |
| Agriculture | | | | | | | | | | | | | | |
| Soybean | Soybean | CBOT | 3,935 | 3,935 | 3,935 | 3,935 | 3,935 | 3,889 | 3,843 | 3,798 | 3,752 | 3,752 | 3,706 | 3,706 |
| Corn | Corn | CBOT | 4,773 | 4,773 | 4,773 | 4,773 | 4,773 | 4,775 | 4,778 | 4,780 | 4,782 | 4,782 | 4,784 | 4,784 |
| Soybean Meal | Soybean Meal | CBOT | 3,858 | 3,858 | 3,858 | 3,858 | 3,858 | 3,731 | 3,605 | 3,479 | 3,352 | 3,352 | 3,226 | 3,226 |
| Wheat | Wheat | CBOT | 1,644 | 1,644 | 1,644 | 1,644 | 1,644 | 1,630 | 1,617 | 1,604 | 1,590 | 1,590 | 1,577 | 1,577 |
| Soybean Oil | Soybean Oil | CBOT | 19,213 | 19,213 | 19,213 | 19,213 | 19,213 | 18,856 | 18,500 | 18,144 | 17,788 | 17,788 | 17,432 | 17,432 |
| Coffee | Coffee 'C' | NYBOT | 3,284 | 3,284 | 3,284 | 3,284 | 3,284 | 3,506 | 3,727 | 3,949 | 4,171 | 4,171 | 4,392 | 4,392 |
| Cotton | Cotton No. 2 | NYBOT | 7,084 | 7,084 | 7,084 | 7,084 | 7,084 | 7,050 | 7,015 | 6,981 | 6,947 | 6,947 | 6,913 | 6,913 |
| Sugar | Sugar No. 11 | NYBOT | 26,132 | 26,132 | 26,132 | 26,132 | 26,132 | 25,784 | 25,437 | 25,089 | 24,741 | 24,741 | 24,394 | 24,394 |
| Livestock | | | | | | | | | | | | | | |
| Live Cattle | Live Cattle | CME | 5,746 | 5,746 | 5,746 | 5,746 | 5,746 | 5,924 | 6,102 | 6,280 | 6,458 | 6,458 | 6,637 | 6,637 |
| Lean Hogs | Lean Hogs | CME | 2,978 | 2,978 | 2,978 | 2,978 | 2,978 | 3,405 | 3,832 | 4,260 | 4,687 | 4,687 | 5,114 | 5,114 |

FIG. 9

Commodity Total Return

| COMMODITY TOTAL RETURNS | COMMODITY EXCESS RETURNS | COMMODITY WEIGHTS | CUSTOM VIEWS | | | CUSTOMIZE | | |
|---|---|---|---|---|---|---|---|---|
| | Since Inception Tot. Ret. | Daily Total Return | MTD Total Return | YTD Total Return | 3 Month Tot. Ret. | 6 Month Tot. Ret. | 12 Month Tot. Ret. | Inception (or Start Date) |
| LBCI | 100.00 | 1.22 | -1.00 | 3.19 | 6.62 | 3.19 | 16.20 | 1/1/01 |
| Energy | 100.00 | 0.31 | 1.15 | -8.67 | 2.67 | -8.67 | 3.46 | 1/1/01 |
| Crude Oil | 100.00 | 0.57 | 3.06 | 11.25 | 6.66 | 11.25 | 14.26 | 1/1/01 |
| Natural Gas | 100.00 | -0.49 | -8.15 | -53.51 | -23.22 | -53.51 | -35.10 | 1/1/01 |
| Unleaded Gasoline | 100.00 | 1.42 | 5.38 | 15.88 | 20.28 | 15.88 | 32.64 | 1/1/01 |
| Heating Oil | 100.00 | -1.05 | 0.23 | 7.35 | 6.28 | 7.35 | 3.36 | 1/1/01 |
| Metals | 100.00 | 2.57 | -5.91 | 40.49 | 19.07 | 40.49 | 85.33 | 1/1/01 |
| Industrial | 100.00 | 1.59 | -5.59 | 54.02 | 29.01 | 54.02 | 113.01 | 1/1/01 |
| Aluminum | 100.00 | 3.00 | -1.08 | 14.61 | 6.46 | 14.61 | 53.38 | 1/1/01 |
| Copper | 100.00 | 0.22 | -6.45 | 74.09 | 39.98 | 74.09 | 156.78 | 1/1/01 |
| Zinc | 100.00 | 3.83 | -12.22 | 73.80 | 24.98 | 73.80 | 169.04 | 1/1/01 |
| Nickel | 100.00 | 2.51 | -2.32 | 64.61 | 45.07 | 64.61 | 55.10 | 1/1/01 |
| Precious | 100.00 | 4.66 | -6.55 | 18.94 | 2.65 | 18.94 | 42.46 | 1/1/01 |
| Gold | 100.00 | 4.62 | -4.70 | 18.13 | 5.22 | 18.13 | 39.71 | 1/1/01 |
| Silver | 100.00 | 4.81 | -12.77 | 22.36 | -5.79 | 22.36 | 63.29 | 1/1/01 |

FIG. 10

Commodity Weights

| | COMMODITY TOTAL RETURNS | COMMODITY EXCESS RETURNS | COMMODITY WEIGHTS | CUSTOM VIEWS | | CUSTOMIZE |
|---|---|---|---|---|---|---|
| | | Number of Issues (Stats) | Prior Close % of Index | Current % of Index | Current % of Subindex 1 | Current % of Subindex 2 | New Year's Projected % Index |
| LBCI | | 20 | 100.00 | 100.00 | | | 100.00 |
| Energy | | 4 | 50.96 | 51.14 | 100.00 | | 55.38 |
| Crude Oil | | 1 | 28.11 | 28.13 | 55.01 | | 27.57 |
| Natural Gas | | 1 | 7.34 | 7.44 | 14.56 | | 13.51 |
| Unleaded Gasoline | | 1 | 8.15 | 8.26 | 16.15 | | 7.02 |
| Heating Oil | | 1 | 7.36 | 7.31 | 14.30 | | 7.29 |
| Metals | | 6 | 29.39 | 29.41 | 100.00 | | 24.97 |
| Industrial | | 4 | 19.93 | 19.95 | 67.94 | 100.00 | 15.97 |
| Aluminum | | 1 | 4.33 | 4.40 | 14.96 | 22.05 | 4.82 |
| Copper | | 1 | 10.34 | 10.41 | 35.40 | 52.18 | 7.62 |
| Zinc | | 1 | 2.61 | 2.58 | 8.79 | 12.95 | 1.96 |
| Nickel | | 1 | 2.64 | 2.56 | 8.69 | 12.81 | 1.57 |
| Precious | | 2 | 9.46 | 9.46 | 32.16 | 100.00 | 9.01 |
| Gold | | 1 | 7.41 | 7.43 | 25.25 | 78.52 | 6.98 |
| Silver | | 1 | 2.05 | 2.03 | 6.91 | 21.48 | 2.03 |
| Agriculture | | 8 | 17.27 | 17.11 | 100.00 | | 16.79 |

FIG. 11

LBCI Constituents

To generate a list of Index Constituents, specify the input below. Then click GO to view the results:
As Of: _____ GO

| Contract_ID | Price Beg. | Close Price | % of Index Price |
|---|---:|---:|---:|
| BO_2006Z | 26.71 | 27.27 | 100.00 |
| C_2006U | 239.75 | 246.00 | 100.00 |
| CL_2006Q | 73.52 | 73.93 | 100.00 |
| CT_2006Z | 53.66 | 54.16 | 100.00 |
| GC_2006Q | 588.90 | 616.00 | 100.00 |
| GII.LMEALIMINUM_2006Q | 2,540.25 | 2,616.00 | 100.00 |
| GII.LMECOPPER_2006Q | 7,385.00 | 7,380.00 | 100.00 |
| GII.LMENICKEL_2006Q | 21,245.00 | 21,775.00 | 100.00 |
| GII.LMEZINC_2006Q | 3,116.00 | 3,235.00 | 100.00 |
| HO_2006Q | 205.04 | 202.86 | 100.00 |
| KC_2006U | 98.85 | 101.10 | 100.00 |
| LC_2006Q | 85.58 | 85.68 | 100.00 |
| LH_2006Q | 69.48 | 70.38 | 100.00 |
| NG_2006Q | 6.14 | 6.10 | 100.00 |
| RB UNL_2006Q | 235.15 | 238.46 | 100.00 |
| S_2006X | 609.50 | 622.50 | 100.00 |
| SB_2006V | 16.23 | 16.34 | 100.00 |
| SI_2006U | 10.42 | 10.92 | 100.00 |
| SM_2006Z | 177.30 | 182.00 | 100.00 |
| W_2006U | 395.00 | 396.00 | 100.00 |

FIG. 12

Index Time Series

| Date | COMMODITY TOTAL RETURNS | COMMODITY EXCESS RETURNS | COMMODITY WEIGHTS | CUSTOM VIEWS | | CUSTOMIZE | | |
|---|---|---|---|---|---|---|---|---|
| | Since Inception Tot. Ret. | Daily Total Return | MTD Total Return | YTD Total Return | 3 Month Tot. Ret. | 6 Month Tot. Ret. | 12 Month Tot. Ret. | Inception (or Start Date) |
| 06/30/2006 | 100.00 | 1.22 | -1.00 | 3.19 | 6.62 | 3.19 | 16.20 | 1/1/01 |
| 06/29/2006 | 98.80 | 2.27 | -2.19 | 1.95 | 5.26 | 2.75 | 13.37 | 1/1/01 |
| 06/28/2006 | 96.60 | -0.24 | -4.37 | -0.32 | 3.55 | -0.13 | 10.32 | 1/1/01 |
| 06/27/2006 | 96.83 | -0.21 | -4.14 | -0.08 | 5.33 | 2.19 | 7.69 | 1/1/01 |
| 06/26/2006 | 97.03 | 0.79 | -3.94 | 0.13 | 5.66 | n/a | 6.83 | 1/1/01 |
| 06/23/2006 | 96.27 | -0.34 | -4.69 | -0.66 | 5.28 | -0.86 | 6.44 | 1/1/01 |
| 06/22/2006 | 96.60 | -0.10 | -4.37 | -0.32 | 8.16 | -1.49 | 7.50 | 1/1/01 |
| 06/21/2006 | 96.69 | 1.24 | -4.28 | -0.23 | 7.56 | -3.42 | 6.92 | 1/1/01 |
| 06/20/2006 | 95.51 | -0.41 | -5.45 | -1.45 | 6.89 | -3.87 | 4.27 | 1/1/01 |
| 06/19/2006 | 95.90 | -1.85 | -5.06 | -1.04 | 5.30 | -3.60 | 5.58 | 1/1/01 |
| 06/16/2006 | 97.71 | -0.34 | -3.27 | 0.83 | 6.81 | -1.42 | 9.75 | 1/1/01 |
| 06/15/2006 | 97.38 | 2.04 | -3.60 | 0.48 | 7.28 | -2.75 | 10.70 | 1/1/01 |
| 06/14/2006 | 95.43 | 0.74 | -5.53 | -1.53 | 4.26 | -6.81 | 9.94 | 1/1/01 |
| 06/13/2006 | 94.73 | -3.31 | -6.22 | -2.25 | 5.36 | -9.25 | 8.65 | 1/1/01 |
| 06/12/2006 | 97.97 | -0.94 | -3.01 | 1.10 | 10.98 | -4.82 | 14.88 | 1/1/01 |
| 06/09/2006 | 96.90 | 0.52 | -2.09 | 2.05 | 11.71 | -1.90 | 14.88 | 1/1/01 |
| 06/08/2006 | 98.39 | -1.59 | -2.59 | 1.53 | 12.15 | -4.07 | 16.17 | 1/1/01 |

FIG. 13

SYSTEMS AND METHODS FOR PROVIDING A LIQUIDITY-BASED COMMODITIES INDEX

PRIORITY APPLICATION

This application claims the benefit of U.S. Provisional Patent Application No. 60/841,704, filed Sep. 1, 2006, titled Commodity Index. The entire contents of that application are incorporated herein by reference.

INTRODUCTION

In one aspect, the present invention comprises a method and system for providing a commodities index. A commodity is an article of trade or commerce. Commodities have been exchanged in a variety of manners, including, for example market transactions, futures markets, spot markets and other exchange transactions. Commodities indices provide a way for investors to invest in multiple commodities across product types and sectors in a single transaction while providing a useful metric of broad market returns to measure performance.

Certain aspects of the present invention overcome the limitations and disadvantages of the prior art and provide certain benefits for commodity indices. Although the inventions described herein are in reference to commodities indices, the inventions may be applied to other types of indices, as appropriate.

SUMMARY OF THE INVENTION

In embodiments of the invention, a method is provided comprising: receiving liquidity related data for a commodity, said liquidity related data including a historical daily dollar value of contracts traded for said commodity; calculating a liquidity for said commodity based on an average daily dollar value of contracts traded for said commodity; setting a liquidity threshold for including said commodity in an index; selecting said commodity for inclusion in said index based on a comparison of said calculated liquidity to said liquidity threshold; calculating a liquidity factor for said selected commodity; and weighting said selected commodity based on said liquidity factor of said commodity.

Other features of the invention include that an average daily dollar value of contracts traded for said commodity equals an average of a sum of: (a closing price of a contract) multiplied by (a daily reported trading volume of said contract) multiplied by (a fixed number of units in said contract). Liquidity of contracts may be evaluated across a plurality of contracts for said commodity and a plurality of settlement dates for said commodity on more than one commodity futures exchange. A liquidity factor may be calculated using a formula:

$$LF = \frac{DVCT_{PrevNovME}}{Price_{2ndBusinessDay}}.$$

Typically weighting a selected commodity is performed on a periodic basis and using a formula:

$$W_{b,i} = \frac{LF_i * P_{b,i}}{\sum (LF * P_b)_{CI}}.$$

Embodiments of the invention also may be customized by a user so that, for example, a liquidity threshold is defined by a user.

Other embodiments of the invention provide for rolling a contract for said commodity, including steps of: identifying an expiring contract for said commodity; incrementally rolling said expiring contract for a later dated contract; calculating a second liquidity for a rolling contract based on a price of said expiring contract and a price of said later dated contract; calculating a second liquidity factor of said rolling contract; and reweighting said commodity based on said second liquidity factor of said commodity. Incrementally rolling said expiring contract may be performed over a period that is defined by a user. Other customizations of incremental rolling include, for example, that an expiring contract is identified by a user.

Another embodiment of the invention is directed to an index that comprises: a plurality of commodities each having a calculated liquidity, said calculated liquidity based on an average daily dollar value of contracts traded for each of said plurality of commodities, and said calculated liquidity satisfying a threshold liquidity for inclusion in an index; wherein each of said plurality of commodities is weighted according to a liquidity factor of each of said plurality of commodities proportionate to said liquidity factor of another of said plurality of commodities.

Features of said index include, for example, that said average daily dollar value of contracts traded for each of said plurality of commodities equals an average of a sum of: (a closing price of a contract) multiplied by (a daily reported trading volume of said contract) multiplied by (a fixed number of units in said contract) and various customizations, such as said threshold liquidity being defined by a user. The calculated liquidity of each of said plurality of commodities may be based on a trading volume of a contract for each of said plurality of commodities over a trailing period. The liquidity factor for each of said plurality of commodities is calculated using a formula:

$$LF = \frac{DVCT_{PrevNovME}}{Price_{2ndBusinessDay}}.$$

Further features include that said calculated liquidity is evaluated across a plurality of contracts for each of said plurality of commodities and a plurality of settlement dates for each of said plurality of commodities on more than one commodity futures exchange. Generally, each of said plurality of commodities is weighted on a periodic basis and may be weighted according to a formula:

$$W_{b,i} = \frac{LF_i * P_{b,i}}{\sum (LF * P_b)_{CI}}.$$

Another feature of the invention is that each of the plurality of contracts may comprise a contract that can be incrementally rolled for a later dated contract. A user may define the expiring contract for incrementally rolling for a later dated contract, and a period for incremental rolling, or other aspects of rolling a contract.

Generally, incrementally rolling a contract for a commodity in an index is performed by: selling on a first day a first portion of an expiring contract and purchasing a corresponding first portion of said later dated contract; and selling on a second day a second portion of said expiring contract and purchasing a corresponding second portion of said later dated contract; calculating on said first day, a first liquidity factor for a rolling contract based on a price of said expiring contract on said first day and a price of said later dated contract on said first day; weighting said rolling contract in an index based on said first liquidity factor; and reweighting said commodity in said index on said second day based on a second liquidity factor for said rolling contract based on a price of said expiring contract on said second day and a price of said later dated contract on said second day.

More details of various aspects of the invention will be apparent as further described herein.

BRIEF DESCRIPTION OF THE DRAWINGS

FIG. 2 depicts a table of commodities and contracts in an index according to an embodiment of the invention;

FIG. 3 depicts a table of weights for an index according to an embodiment of the invention;

FIG. 5 depicts a table of an active contracts calendar according to an embodiment of the invention;

FIG. 6 depicts a table of daily spot and excess returns for a contract during a roll period according to an embodiment of the invention;

FIG. 7 depicts a table of total returns for a contract during a roll period according to an embodiment of the invention;

FIG. 8 depicts a table of calculations of commodity liquidity factors according to an embodiment of the invention;

FIG. 9 depicts a table of index rebalancing in an index liquidity factor roll according to an embodiment of the invention; and FIGS. 10-13 depict electronic reports of index information according to an embodiment of the invention.

DETAILED DESCRIPTION

FIGS. 1-13 present various embodiments of systems and methods for providing a commodities index.

Indices according to embodiments of the invention are provided that have, generally, investable components, daily (or more frequent) performance data, timely index characteristics (pricing, composition, etc.), historical information, a make up that reflects current market dynamics, low turnover, transparency, a benchmark (criteria or other threshold) that is specified in advance, or other characteristics. The term index is used herein to describe a portfolio of assets, commodities, securities, bonds, etc., that represent a particular market or a portion of a market. An index may be used to measure changes in an economy, portfolio, sector or other aspect of a market. An index typically has a calculation methodology. One exemplary methodology is described herein with reference to the figures.

Figure 1:
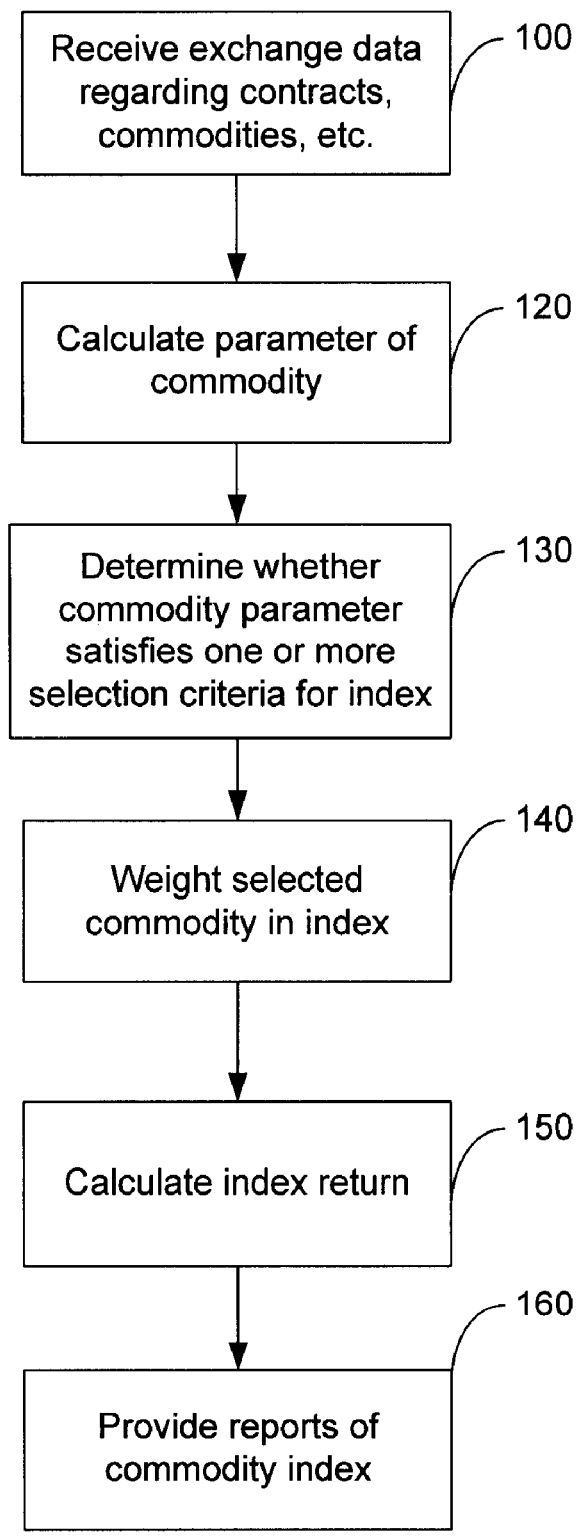
FIG. 1 depicts a flow diagram of a method for providing a commodities index according to an embodiment of the invention.

As shown in FIG. 1, exchange data may be received, step 100, for commodities and commodities contracts from one or more exchanges, such as the New York Mercantile Exchange, London Metal Exchange, Chicago Board of Trade, New York Board of Trade, Chicago Mercantile Exchange, or other exchange. Such data may be received in continuous data feeds, daily data feeds, etc. The data may be received by a central server and stored, typically in a database, which may be accessed by one or more processors or client computers. Other systems may also be used to implement the indices described herein.

The received data may be used to calculate one or more parameters for each commodity, step 120. One of the calculated parameters may be commodity liquidity.

Quantifying Commodity Liquidity

In one calculation for comparing commodity markets, an average of a trailing period (e.g., three years) average daily dollar volume of contracts traded (DVCT) for any commodity that may be potentially eligible for the index is determined. Converting published volumes from each commodity exchange into a daily dollar value can allow for direct comparisons of liquidity across exchanges in a common metric. Daily calculations over a trailing period, for example, a three year period, may capture intra-month liquidity changes while offering a historical perspective that reflects seasonality, cyclicality and other recurring effects, of different markets and maintains index stability. Liquidity may be evaluated across all contracts and settlement dates on one or more global commodity futures exchanges.

For each commodity in a market, or in an index, a daily DVCT may be calculated using the following steps:

(1) Identify contract-specific trading volumes and closing prices as reported (daily) by each global futures exchange. All futures expirations of a standardized contract with trading activity may be included in the calculation. If volumes are not published for specific settlement dates in the future, aggregated volumes published for each contract across all settlement dates can be used for the calculation. Other aggregated or average values may also be used in the calculation.

(2) To derive the daily DVCT of a contract: multiply a closing price of a contract by a daily reported trading volume and a fixed number of units in which each contract is denominated.

(3) Aggregate the daily values derived in step (2) for all future settlement dates of a contract to determine a summed daily dollar volume traded for an entire commodity contract.

(4) Average the daily dollar volume traded in step (3) over a trailing period, e.g., three-year period, to calculate a trailing three-year average daily dollar volume of contracts traded (DVCT).

Commodity Selection

The calculated liquidity or other calculated parameter of the commodity may be used as a basis for determining whether a commodity satisfies one or more selection criteria for inclusion in an index, step 130. A commodity selected for a commodities index ideally will meet a minimum threshold liquidity, or other base standard. Generally, the liquidity minimum threshold is based on historical trading volume, such as over a trailing three year period.

Some additional factors which may relate to calculating liquidity and satisfying a minimum liquidity threshold for inclusion in the index are as follows:

Commodities should have an average daily dollar trading volume exceeding a threshold dollar amount, such as $250M over a previous period (e.g., 3 years). The dollar amount and time period may differ, for example, based on differences in exchange data reporting volumes, index design, or other basis.

Index-eligible commodities will typically remain in the index until their average daily dollar volume traded drops below a certain threshold, such as $200M. This may help maintain the index compositional stability and prevent commodities from exiting the index for a period and then re-entering for a next period if the commodity reaches the daily dollar trading volume threshold dollar amount.

Typically, the largest contract per commodity based on liquidity for an exchange may be index-eligible. For example, a West Texas Intermediate Crude Oil that trades on the New York Mercantile Exchange (NYMEX) will be the index-eligible (or index-selected) contract for crude oil while Brent Crude that trades on the Inter Continental Exchange (ICE) in a smaller contract will not, despite the fact that both contracts meet an index liquidity threshold. If a second largest contract's liquidity surpasses a larger contract's, it may replace the larger index-eligible contract either immediately, at a later time (e.g., if an index is periodically reset), or other time. Examples of commodities index eligible commodities are shown in chart 200 of FIG. 2. As shown, commodities (210) for an index may include, for example, crude oil, heating oil, natural gas, etc., Other information relating to the commodity is also shown in FIG. 2, such as its respective contract (220), exchange (230), and ticker symbol (240). Column 250 shows other commodity contracts which may not be eligible for the index, e.g., Brent Crude on the IPE.

If an index-eligible contract of a particular commodity is discontinued or substituted in the market by a different contract, the new or replacement contract may be substituted in the index. Advanced notice of such substitution may be given to index users.

Commodities that are considered to be derivatives or downstream products created from other index-eligible commodities may be treated as separate commodities for the index so long as they have sufficient market liquidity and may be evaluated for index eligibility on a standalone basis. For example, soybeans, soybean meal, and soybean oil may be treated as separate commodities and each may be index-eligible if their liquidity exceeds a threshold.

In some embodiments commodities included in the index may be limited by a currency of the contract, for example, only dollar-denominated contracts may be index-eligible. Other indices may have other non-dollar contracts or combinations of currency-based contracts.

As described herein, selection of a commodity for inclusion in the index may be according to a liquidity threshold. Some other factors or other parameters used for the selection of a commodity described herein or known to one skilled in the art may also be used for commodity selection.

Commodity Weighting

Referring again to FIG. 1, the selected commodities may be weighted in an index, step 140. Indices may be provided using one or more weights for index components. In some embodiments of the invention, an index is provided using a liquidity measure as a basis for one or more index rules. Using a liquidity measure for weighting a commodities index is advantageous because it reflects production patterns, expectations of future production levels, commodity consumption, potential storage concerns, and other indications of liquidity. Liquidity data may also provide other indicators for a commodity, or track the sentiment of more participants in an asset class than other data, e.g., production data, as active and passive index investors all interact in futures markets.

In some embodiments of the invention, composition and weighting of a commodities index may be reset annually or on a periodic basis to reflect updated historical commodity contract liquidity data. An example of annual weights for a commodities index is depicted in chart 300 of FIG. 3. As shown in FIG. 3, commodities selected for an index are shown in columns 310 and weightings for respective years given in columns 320.

Indices may also be continuously updated as relevant data is received. Index components are typically selected and weighted based on historical commodity futures liquidity, but it is understood that selections and weightings for index components may also be based on other data. Generally, liquidity is derived from an exchange reported trading volume of non-financial commodities futures, but may also be derived from other sources. Generally, weights for a single year for each commodity included in an index sum to 100%.

When one or more commodities have been selected for an index, each commodity may be weighted in the index. In general, commodities are weighted and re-weighted on a periodic basis, e.g., annually, such as at a roll period, or other term, based on an average daily liquidity for a previous period, or other basis. The average daily liquidity may be converted into a commodity liquidity factor that may remain constant for each commodity for a period. Although the common liquidity factor generally remains constant for a period, index weightings may adjust throughout the period, e.g., on a daily basis as prices (or other contract characteristic) change in an underlying commodity contract.

In general, each index-eligible commodity will be weighted in an index in proportion to its liquidity relative to other index-eligible contracts or commodities. Contract data from various exchanges may require scaling to accurately reflect relative liquidity on contracts on different exchanges.

Occasionally a commodity may have incomplete liquidity data for a full period (e.g., three years worth) for an average daily liquidity calculation. In this scenario, average daily liquidity may be used for data points that are missing. Generally, this is used when a time series is longer than one year. Also, if an index-eligible contract was substituted for a different contract within the commodity, the previous contract's historical liquidity may also be considered to determine index weights for the commodity.

In some embodiments, there are no caps or floors for a particular commodity or sector weighting based on liquidity.

In embodiments of the commodities index, index weights are published periodically, e.g., on a daily basis. Projected index weights may also be calculated and published periodically using trailing data for the period immediately preceding the calculation/publication date. Examples of evolutions of index weights is shown in FIG. 3. As shown, an increasing allocation of metals in 2006 reflects that the metal sector improved. Also shown is that the liquidity factor remains constant while price appreciation increased weights of the components in the index.

Index Return Calculations

Referring again to FIG. 1, one or more index returns may be calculated, step 150, as described herein. A long position in a commodity futures contract typically generates returns from several sources, including: a change in a spot price of a commodity, a roll yield, collateral interest, or other source.

Changes in a commodity spot price are that if an index is long in (or otherwise holds) a particular commodity and the spot price appreciates, then a positive return will accrue to the investor.

A roll yield may depend on pricing of longer dated futures contracts relative to nearby futures and spot commodity prices. A "roll" is selling an expiring or nearby active contract and buying a longer dated contract in order to maintain exposure to the relevant future contract. When longer dated contracts are priced lower than nearer contract and spot prices, the market may be in backwardation. When the opposite occurs and longer contracts are priced higher, the market is considered to be in contango. Positive roll yield is generated in backwardated markets when higher priced spot or near term futures contracts are "sold" to "buy" lower priced longer dated contracts. Negative roll yield occurs in contangoed markets as higher futures prices roll down to the spot price. A combined return of spot price movement and roll yield is referred to as excess return in commodities index parlance and may be calculated by tracking the price changes of the index futures contract on a periodic basis, e.g., daily.

Another source of return from a long futures position comes from collateral posted as margin. A fully collateralized futures position posts the full investment as margin, which is then invested in money market or other similar cash instruments that generate a return.

Spot, excess, total returns and other calculations may be performed on a periodic (such as daily) basis and such calculations may be published in reports or made available electronically, etc.

Calendar

In general, a commodities index calendar will follow the calendar of the NYMEX or other chosen exchange. If data for an index commodity is missing because the commodity is on another exchange that has a different calendar schedule, the data from the previous available business day is used for index calculations. When the index exchange is closed, calculations will be performed on the next day of business that the exchange is open. Contract roll schedules will typically reflect a base exchange (e.g., NYMEX) calendar for all commodities. If there is a NYMEX holiday before or during a roll period, a scheduled roll may be pushed forward to the next index business day.

Commodity Roll Mechanics and LBCI Contract Calendar

Figure 4A:
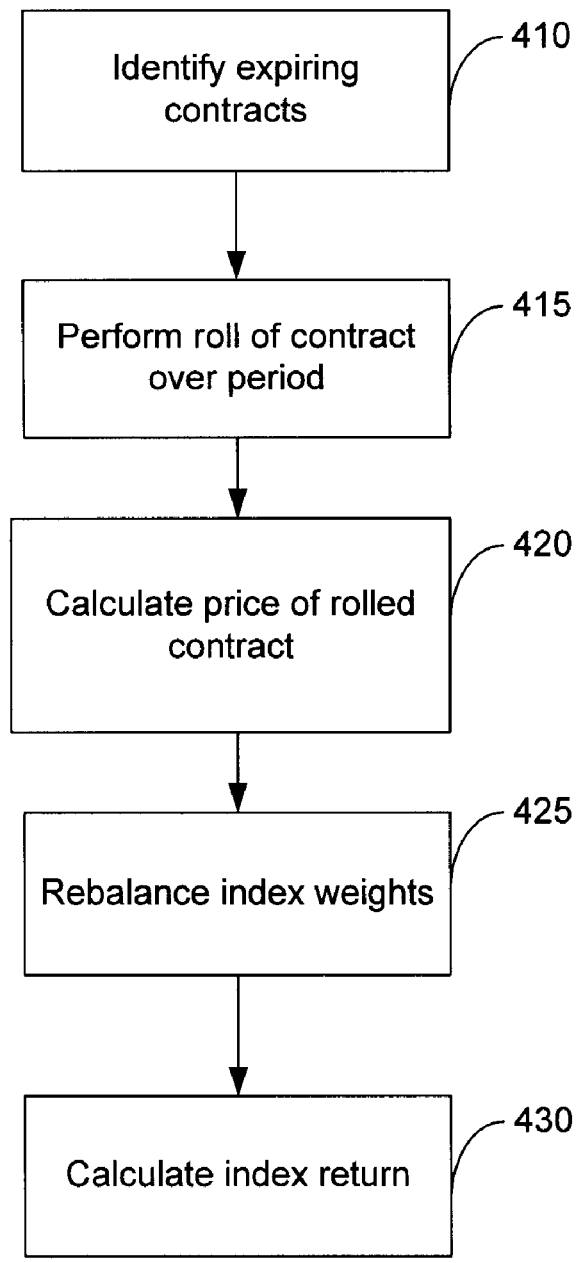
FIG. 4A depicts a flow diagram of a method for rolling a commodities contract according to an embodiment of the invention.
Figure 4B:
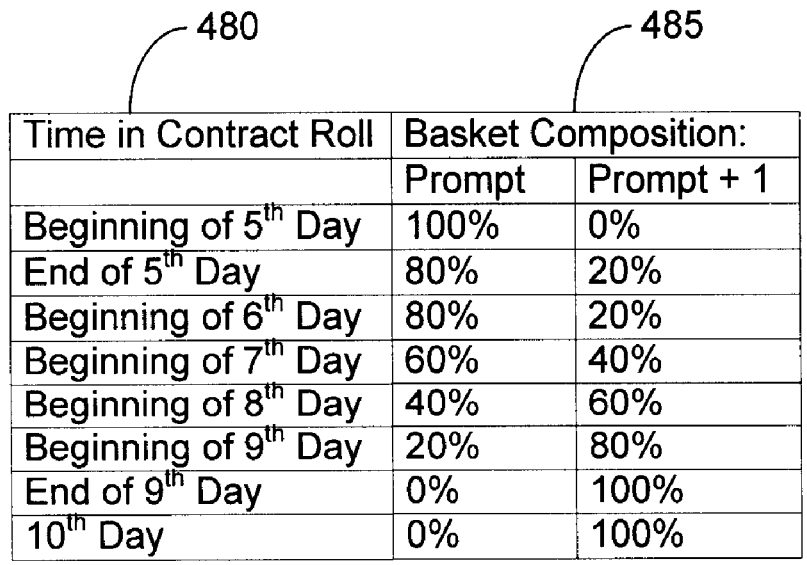
FIG. 4B depicts a table of basket composition in an incremental roll according to an embodiment of the invention.

The mechanics of rolling a contract are described with reference to the flow diagram of FIG. 4A. Contracts that are soon to be expired are identified to be rolled, step 410. The contracts may be identified automatically based on their expiration date, or identified by a user who may wish to customize the timing of a contract roll. Underlying constituents of a commodities index are commodities futures contracts that may be rolled forward to a new contract date as the contract approaches its settlement date. Therefore, at the contract level, there are up to two contracts that can contribute to index returns: the prompt (nearby) contract and the prompt+1 (next nearby) contract that is rolled into.

At the start of a term, e.g., each month, a prompt contract may be used for index returns calculations. During a roll period, the prompt contract and the prompt+1 contract are used to price the index. After the roll has been completed, what was initially the prompt+1 contract at the start of the month becomes the prompt contract for the remainder of the month (until the start of the next roll period) and is used to price the commodity.

Contract Roll

For commodities that are scheduled to roll forward in a given index period, such as a month, step 415. A roll period may commence in advance of the end of the roll period, e.g., on the fifth business day of the month in which the contract is to expire, with 20% (or other portion) of the underlying contracts rolled at the end of each day from the prompt to the prompt+1. Returns during the roll period may be calculated according to the following illustrative example, also shown in chart 400 of FIG. 4B.

On the fifth index business day of each month (see time column 480), commodity returns will reflect 100% of the price movements of the prompt contract. At the end of the fifth business day, 20% of the prompt contract will be rolled to the prompt+1. (See basket composition column 485.) Thus, when a portion of a prompt contract is rolled, a corresponding portion of a prompt+1 contract is purchased.

At the beginning of the sixth business day, commodity returns will reflect a contract basket containing 80% of the prompt contract at the start of the day and 20% of the prompt+1. Excess returns will be calculated on this basket. At the end of the day an additional 20% is rolled.

On the seventh business day, the basket will consist of 60% prompt/40% prompt+1. At the eighth business day, the basket will consist of 40% prompt/60% prompt+1. At the ninth business day, the basket will consist of 20% prompt/80% prompt+1. At the end of the ninth business day, the prompt contract will have been fully rolled into the prompt+1, which then becomes the new prompt until the next roll period. Returns on the tenth business day will comprise 100% of the new prompt contract that has just been full rolled into. It is understood that this example is illustrative and may also be completed using different percentages of the contract at different times. In this example, each portion of a prompt contract that is rolled is replaced in the basket by a corresponding portion of prompt+1 contract. The corresponding portion is substantially similar to the portion rolled in the prompt contract. However, in certain instances, dissimilar portions may also be used for the prompt+1 contract.

Adjustments to the rolling process may occur in a number of market circumstances, e.g., when it may be difficult to liquidate or establish positions in the market to perform a roll, or other circumstance. If a market disruption event occurs on the first day of a roll process, different percentages of the roll proportion may occur. Examples of disruption events are that a commodity reaches a limit price during the portion (for example, last 15 minutes) of a trading session, trading is interrupted or terminated on an exchange, or other event may cause a roll to be deferred. When market disruption events occur, a notice may be provided to index users.

Contract Calendar

A contract calendar specifies which contracts (by settlement month) are used to calculate index returns for each monthly reporting period. See, for example, table 500 shown in FIG. 5 which shows commodities 510 and contracts 520 per calendar month 530 and respective prompt contract and the prompt+1 contract for each. Such information is typically provided if the commodity 510 is scheduled to be rolled during the month. If a roll is not scheduled, then, generally, only the prompt contract is listed. Contracts may be selected to ensure there is sufficient market liquidity in each commodity when calculating index returns. Monthly contracts for a specific commodity that are less liquid and have significantly lower trading volumes relative to other settlement months will be excluded from the contract calendar, and will not be rolled into or included in commodity price calculations. This table will be published periodically, e.g., annually, such as in the form of table 500.

Spot, Excess and Total Returns

A commodities index returns (spot, excess, and total) may be calculated by weighting commodity level returns of its components by their contribution to the index, as follows:

Spot Return Calculations

Commodity level spot returns represent the daily price appreciation of the underlying futures contracts used to price the index before any contract rolling has occurred. Typically the spot return will reflect the return of the current day's prompt contract or a combination of the prompt and prompt+1 contracts compared to a previous day's closing price before that day's roll has occurred.

The formula for a daily spot return on an index commodity is:

$$SpotReturn_t = \left(\frac{Price_t - Price_{t-1}}{Price_{t-1(BeforeRoll)}}\right) - 1$$

Where: $Price_t$=Commodity Futures Price on index business day t $Price_{t-1(Before\ Roll)}$=Commodity Futures Price on an index day t-1 (before the roll has occurred at the end of the day).

During a roll period, a price may be calculated, step 420, such that $Price_t$ may be a composite price of the prompt contract and the prompt+1 contract weighted by the percentage that has been rolled at the end of the previous index business day while $Price_{t-1}$ may be a composite of closing prices before the roll has occurred for the day. Because the contract roll begins at the end of the fifth business day, (or other day or time period), composite prices may be used for price t on the sixth through ninth days' return calculations (or whenever a roll is processed) and the seventh through tenth days' return calculations for $Price_{t-1}$.

Excess Return Calculations

Commodity level excess returns represent a daily price appreciation for the underlying futures contracts plus roll yield. This calculation may reflect the spot and roll return of the prompt contract or a combination of the prompt and prompt+1 contracts.

Daily Excess Return

The formula for daily excess return on an index commodity is as follows:

$$Excess\ Return_t = \left(\frac{(Price_t - Price_{t-1})}{Price_{t-1(AfterRoll)}}\right) - 1$$

Where: $Price_t$=Commodity Futures Price on index business day t $Price_{t-1(After\ Roll)}$=Commodity Futures Price on index business day t-1 (after roll)

During the roll period, Price t and Price t-1 will be a composite price of the prompt contract and the prompt+1 contract weighted by a percentage that has been rolled at the end of the previous index business day. Because the contract roll begins at the end of the fifth business day, composite prices are used on the sixth through ninth days' return calculations.

For example, on the sixth business day of the month:

$Price_t$=(80% *$Price_{t\ Prompt}$)+(20% *$Price_{t\ Prompt+1}$)

$Price_{t-1(After\ Roll)}$=(80% *$Price_{t-1\ Prompt}$)+(20% *$Price_{t-1\ Prompt+1}$)

An example of a daily spot and excess returns for a commodity is shown in Table 600 of FIG. 6.

Quantifying Roll Yield

Once spot and excess returns are calculated at the commodity and index level, it is possible to quantify the positive roll yield for backwardated markets and the negative roll yield for contangoed commodities. There will only be a roll yield during the roll period. On all other days of the month, the roll yield will be zero.

$Roll\ Yield_{Daily}$=Excess $Return_{Daily}$-Spot $Return_{Daily}$

Total Return Calculations

A fully collateralized long futures position earns a risk-free return on the collateral in addition to the daily price appreciation of the futures contract. For the commodities index and its components, a calculation for a Treasury bill return is added to commodity excess returns to represent a total return earned by a fully collateralized futures position.

T-Bill Return

Daily T-Bill returns may be compounded from a prior index business day. If a current index business day is more than one calendar day (or other term) from the previous index business day, the T-Bill return will be calculated and compounded for those additional days. For each calendar day during the index calculation period, collateral will earn a daily T-Bill return as specified below. If there is more than one calendar day in the calculation period this return will be compounded for the number of days in the period.

$$\text{3-Month }T\text{-Bill }Return_{Daily} = \left(\frac{1}{1 - (91/360) * HR_{t-1}}\right)^{\frac{1}{91}}$$

Where: $HR_{t-1}$=the quoted "High Rate" at the opening of the index business day using the most recently announced Treasure Bill auction results. This number is published by the Bureau of Public Debt after all T-Bill auctions.

Daily Total Return

Total returns represent the return of a long futures position including price movements and the risk-free return on posted collateral.

Total $Return_{Daily}$=Excess $Return_{Daily}$+T-Bill $Return_{Daily}$

One illustrative example of total returns calculated for a commodity during a roll period is shown in Table 700 of FIG. 7.

Aggregating Commodity Returns into Commodities Index Returns

In general, a commodities index includes major sectors of commodities, such as energy, metals, agriculture, and livestock. Within each sector, additional subsectors are also included, e.g., industrial metals and precious metals (within metals), or grains and softs (within agriculture). Each of these sectors and subsectors may have indices that have liquidity weighted returns of its commodity components.

Two or more factors used to calculate a commodity's daily weight in an index may be its liquidity factor and its index price, or other factor. While a commodity's index price changes daily based on movements in a futures market, its liquidity factor or amount outstanding is resent periodically (e.g., once per year) based on a trailing (three-year) historical contract liquidity.

Calculating Commodity Liquidity Factors

A liquidity factor is a number equivalent to a relative amount of each commodity needed to achieve liquidity based weighting set forth by index rules. It is not a direct measure of trading volume or market liquidity. It is calculated by dividing an average daily dollar value of contracts traded as of a particular date, e.g., November 30th, of a previous year (the year prior to the beginning of year index weights) by the closing index prices of each contract as of the second index business day of a new calendar year. For a given commodity contract, the formula for liquidity factors is:

$$\text{Liquidity Factor} = \frac{DVCT_{PrevNovME}}{Price_{2ndBusinessDay}}$$

Where: $DVCT_{PrevNovME,\ i}$=Trailing three-year average dollar value of contracts traded for index-eligible contract i as of November 30 of the previous year.

$Price_{2nd\ Business\ Day}$=Prompt contract closing price of commodity i, as of the second index business day of the year.

Rebalancing Index Weights

Periodic, e.g., annual, index rebalancing may be implemented, for example, during a January index roll period, step 425. This may occur by switching from a previous year's liquidity factor to a current year's liquidity factor in, for example, daily increments of 20% during a roll period. Rebalancing over a roll period maintains index stability by not causing a major index reweighting on a single index business day. Liquidity factors for the new year may be announced at the end of a second index business day of the year.

In a roll period, or other first period, e.g., first through fifth business day of a current year, a liquidity factor for each commodity will be a previous year's liquidity factor. On the sixth through ninth business days of a roll period, the liquidity factor will be a weighted combination of the previous year's and current year's liquidity factors. From the tenth business day forward, the index will use the current year's liquidity factor. Once 100% of the new liquidity factor is used for index weightings, the annual or other periodic, rebalancing is completed. Daily index weights may then reflect both an annual rebalancing of component weights and daily price movements that have since occurred. An example of calculations of commodity liquidity factors is shown in table 800 of FIG. 8. An example of index rebalancing in a liquidity factor roll is shown in table 900 of FIG. 9.

Introducing and Removing Commodities

As time progresses, a commodities index may experience some turnover in the list of index-eligible commodity contracts. If a new contract becomes eligible or ceases to be eligible at the end of a period, based upon a trailing period history daily average liquidity, then it will enter or exit during a next weighting roll period. Commodities that exit the index will roll into a liquidity factor of zero, while new commodities entering the index will roll from a liquidity factor of zero.

Calculating Daily Index Constituent Weights

Daily index weights are calculated by multiplying the liquidity factor of each commodity by its daily index price (e.g., at the beginning of the day). After summing this value for all index-eligible commodities, a component's percent contribution to the total can be calculated. This percentage is the commodity weight used for a daily index return calculation at the index or subindex level.

$$W_{b,i} = \frac{LF_i * P_{b,i}}{\sum (LF * P_b)_{CI}}$$

Where: $W_{b,i}$=the beginning of day index weight for commodity i
$LF_i$=the liquidity factor for commodity i
$P_{b,i}$=the beginning of day index price for commodity i
$\Sigma(LF*P_b)_{CI}$=Sum of (LF*Price) for each commodities index component.

Calculating Commodities Index Returns

Index level returns may be generated by weighting the commodity level returns (excess or total) of each index constituent by its calculated beginning-of-day weight in that index. These daily index returns are then compounded to generate cumulative returns over periods longer than one day.

$$\text{Daily return Contribution}_{CI\ Component} = W_{b,i} * \text{Return}_t \quad (1)$$

Where: $W_{b,i}$=the beginning of day index weight for Commodity i
Rt=the daily total/excess return of Commodity i $$\text{Daily Commodities index Excess/Total Return} = \Sigma \text{Return Contribution}_{CI} \quad (2)$$

Where: Return Contribution$_{CI}$=the excess/total return contribution of each index component.

Since Inception Index Returns: Commodities index Values

Daily index returns (excess and total) have been indexed to 100 as of each index's inception date (Jun. 30, 2006). These daily returns are compounded to generate a daily index level for the commodities index and each of its components and may be used to calculate periodic returns over any user-defined date range using the following formula:

$$\text{Periodic Return} = \left(\frac{CommodityIndexValue_t}{CommodityIndexValue_{t-1}}\right) - 1$$

Timing of Index Returns

Initial index returns may be published on each index business day for the commodities index and its components. When final closing prices are published for each index contract on respective exchanges, the daily returns may be finalized. Occasionally an exchange may update a final closing price after publication, in which case, the index return will be updated with the new price.

Another embodiment of the invention provides the ability to customize indices for particular investor needs. In some embodiments, a base index is provided which represents a significant component of an overall market. Custom solutions, such as custom weighting is provided for investors that may have a unique perspective or unique need in tracking a commodity, asset class or other item. Index users may set the components and weights of their index as needed. Standalone indices may also be provided for other commodities, e.g., those that may be growing in market importance, or other commodities that have a particular parameter.

In some embodiments, commodities index information is available in an internet browser website, some other live feed or other source that can be accessed by users. Generally, the index information will be published online including data such as, commodity type, sector information, total returns, excess returns, weighting, and other data relevant to the index.

Total Returns

Total returns data included in an index report, see, e.g., FIG. 10, typically includes daily, periodic, and historical total returns for a commodities index, sectors, commodities and sub-indices with data going back to at least the inception for each index and often earlier. Total returns data may be shown as:

Since inception total return: this is approximately the "index value" of the commodities index and its components and is indexed to 100.

Daily total return: a weighted daily total return of each commodity using the beginning of day (or other point in time) index weights for each component.

MTD total return: total returns generated since a start of a current calendar month.

YTD total return: total returns since the start of a current calendar year.

3-, 6-, and 12-month total return: trailing 3-, 6-, and 12-month total return from a current calendar date.

Inception Date: inception or start date of the index returns time series.

Excess Returns

Excess returns information will also be provided in index reports including data for:

Spot price: the weighted price of an underlying commodity future contracts that are used to price the index.

Since inception spot return: spot return "index value" of the commodities index and its components and is indexed to 100.

Daily spot return: weighted daily spot return of each commodity using a beginning of day (or other time) index weight for each component. This combined with daily excess return can be used to quantify index roll yield.

Commodities Index Weights

Commodities index weights are provided, e.g., as shown in FIG. 11, including several of the following metrics:

Number of Issues: a number of contracts within the commodities index and each commodity sub-index. This number generally remains fixed for a period, e.g., an entire calendar year.

Prior Close % Index: The weight of the sector or commodity indices based upon a previous day's closing price multiplied by a Liquidity Factor (LF). The LF is derived from the previous three years (or other period) daily average dollar volume figures divided by the commodity units per contract, e.g., barrels, bushels, etc.

Current % of Index: The end of day weights of all index components as a percentage of the commodities index as of that particular calendar day. This value is derived in a similar manner to the previous attribute, but uses the closing price as of the selected date.

Current % of Subindex 1: The weight of index components as a percentage of its sector (energy, metals, agriculture, livestock).

Current % of Subindex 2: The weight of index components as a percentage of its sub-sector (industrial and precious metals within metals, grains and softs within agriculture).

Next Year's Projected Index: Using the trailing three-year (or other period) average daily dollar volume traded, this projection shows what index composition could look like based on index rules if the index were rebalanced on that particular calendar day. By publishing and updating this number daily, there is enhanced transparency in the application of the index rules. This value as of November 30 (or other date) becomes the official index weight when the index is reset on January 2 (or other date) of each year. In the days preceding November 30, index users will have a daily update of what the commodities index's composition is projecting as of that day.

Other Index Functions

In embodiments of index reports (e.g., electronic reports), users will be able to select aspects of the reports to obtain more information, for example, specific commodity futures contracts that may be used to calculate index returns on that day. There may be a plurality of contracts for each commodity on a given day depending on whether an index component is in the process of being rolled. If a commodity is being rolled, a constituents page (FIG. 12) will list what percentage of a specific futures contract has been rolled as of that day. Other information and functionality available in electronic reports of the index include a returns calculator, which allows index users to calculate periodic returns over any user defined date range for one or multiple indices and a time series which allows users to view and download the historical index returns of the commodities index. (FIG. 13).

In some embodiments, a commodities index may be customized for and by a particular user. Any aspect of the index may be customized according to a user's selections.

User Defined Commodity Selection & Weights

Although a commodities index may include a plurality of specific commodities, a user may select components that are included or excluded in a customized index. In addition, a user may select to track other non-index-eligible commodities with liquid futures markets (feeder cattle, cocoa, lead, tin, etc.) and non-index-eligible contracts for commodities already in the index (Brent Crude Oil, Gasoil, Kansas Wheat), that could also be included in a customized index.

Once a custom universe of index-eligible commodities/contracts has been specified, custom index weights can be applied for those commodities to generate a return history. These weights can use existing index liquidity data or other values provided by the index user. Composition can be reset at a different frequency than the flagship LBCI as well.

Customized Roll Schedules

A user may also specify a customized roll schedule for the index. Customized versions of the index can be created using different assumptions for the contract roll (e.g., which contracts are used, when in the month the roll begins, how much is rolled each day, etc.).

In some embodiments, the index may be used using liquid dollar denominated contracts for liquid commodities. In other embodiments, other currency-based contracts may be used, or other contracts that may have a greater importance for a particular local market. Regional and/or global versions of commodity indices would offer greater geographic diversification to existing commodities markets, for example, for commodities whose supply is concentrated in a particular geographic area and whose prices are highly correlated.

It will be appreciated that the present invention has been described by way of example only, and that improvements and modifications may be made to the invention without departing from the scope or spirit thereof.

What is claimed is:

1. A system comprising:
memory operable to store at least one program; and
at least one processor communicatively coupled to the memory, in which the at least one program when executed b the at least one processor causes the at least one processor to:
receive liquidity related data for a commodity, said liquidity related data including a historical daily dollar value of contracts traded for said commodity;
calculate a liquidity for said commodity based on an average daily dollar value of contracts traded for said commodity;
set a liquidity threshold for including said commodity in an index;
select said commodity for inclusion in said index based on a comparison of said calculated liquidity to said liquidity threshold;
calculate a liquidity factor for said selected commodity; and
weight said selected commodity based on said liquidity factor of said commodity.

2. The system of claim 1, wherein said average daily dollar value of contracts traded for said commodity equals an average of a sum of: (a closing price of a contract) multiplied by (a daily reported trading volume of said contract) multiplied by (a fixed number of units in said contract).

3. The system of claim 1, wherein the at least one processor, further, evaluates said liquidity across a plurality of contracts for said commodity and a plurality of settlement dates for said commodity on more than one commodity futures exchange.

4. The system of claim 1, wherein said liquidity factor (LF) is calculated using a formula:

$$LF = \frac{DVCT_{PrevNovME}}{Price_{2ndBusinessDay}},$$

wherein
$DVCT_{PrevNovME}$ is a trailing three-year average dollar value of contracts traded for an index-eligible contract as of a 30th day of November of a previous year, and
$Price_{2ndBusinessDay}$ is a prompt contract closing price of said commodity, as of a second index business day of a year.

5. The system of claim 1, wherein weighting said selected commodity is performed on a periodic basis.

6. The system of claim 1, wherein weighting said selected commodity based on said liquidity factor of said commodity is performed using a formula:

$$W_{b,i} = \frac{LF_i * P_{b,i}}{\sum (LF * P_b)_{CI}}$$

wherein,
$W_{b,i}$ is a beginning of day index weight for a commodity i,
$LF_i$ is a liquidity factor for said commodity i,
$P_{b,i}$ is a beginning of day index price for said commodity i
$\Sigma(LF*P_b)_{CI}$ is a sum of (LF*P) for each of one or more commodities in said index.

7. The system of claim 1, wherein said liquidity threshold is defined by a user.

8. The system of claim 1, wherein the at least one processor further:
identifies an expiring contract for said commodity;
incrementally rolls said expiring contract for a later dated contract;
calculates a second liquidity for a rolling contract based on a price of said expiring contract and a price of said later dated contract;
calculates a second liquidity factor of said rolling contract; and
reweights said commodity based on said second liquidity factor of said commodity.

9. The system of claim 8, wherein incrementally rolling said expiring contract is performed over a period, said period defined by a user.

10. The system of claim 8, wherein incrementally rolling said expiring contract comprises: selling on a first day a first portion of an expiring contract and purchasing a corresponding first portion of said later dated contract; and selling on a second day a second portion of said expiring contract and purchasing a corresponding second portion of said later dated contract;
wherein reweighting said commodity based on said second liquidity factor of said commodity is based on a price of said expiring contract on said second day and a price of said later dated contract on said second day.

11. The system of claim 8, wherein said expiring contract is defined by a user.

12. The system of claim 1, wherein said calculated liquidity of each of said plurality of commodities is based on a trading volume of a contract for each of said plurality of commodities over a trailing period.

13. A computer readable medium having stored thereon computer executable instructions that, when executed on a computer, configure the computer to perform a method comprising:
receiving liquidity related data for a commodity, said liquidity related data including a historical daily dollar value of contracts traded for said commodity;
calculating with a processor a liquidity for said commodity based on an average daily dollar value of contracts traded for said commodity;
setting a liquidity threshold for including said commodity in an index;
selecting said commodity for inclusion in said index based on a comparison of said calculated liquidity to said liquidity threshold;
calculating with a processor a liquidity factor for said selected commodity; and
weighting said selected commodity based on said liquidity factor of said commodity.

14. The computer readable medium of claim 13, wherein said average daily dollar value of contracts traded for said commodity equals an average of a sum of: (a closing price of a contract) multiplied by (a daily reported trading volume of said contract) multiplied by (a fixed number of units in said contract).

15. The computer readable medium of claim 13, said method further comprising evaluating said liquidity across a plurality of contracts for said commodity and a plurality of settlement dates for said commodity on more than one commodity futures exchange.

16. The computer readable medium of claim 13, wherein said liquidity factor (LF) is calculated using a formula:

$$LF = \frac{DVCT_{PrevNovME}}{Price_{2ndBusinessDay}},$$

wherein
$DVCT_{PrevNovME}$ is a trailing three-year average dollar value of contracts traded for an index-eligible contract as of a 30th day of November of a previous year, and
$Price_{2ndBusinessDay}$ is a prompt contract closing price of said commodity, as of a second index business day of a year.

17. The computer readable medium of claim 13, wherein weighting said selected commodity is performed on a periodic basis.

18. The computer readable medium of claim 13, wherein weighting said selected commodity based on said liquidity factor of said commodity is performed using a formula:

$$W_{b,i} = \frac{LF_i * P_{b,i}}{\sum (LF * P_b)_{CI}}$$

wherein,
$W_{b,i}$ is a beginning of day index weight for a commodity i,
$LF_i$ is a liquidity factor for said commodity i,
$P_{b,i}$ is a beginning of day index price for said commodity i
$\Sigma(LF*P_b)_{CI}$ is a sum of (LF*P) for each of one or more commodities in said index.

19. The computer readable medium of claim 13 wherein said liquidity threshold is defined by a user.

20. The computer readable medium of claim 13, said method further comprising:
identifying an expiring contract for said commodity;

incrementally rolling said expiring contract for a later dated contract;

calculating with a processor a second liquidity for a rolling contract based on a price of said expiring contract and a price of said later dated contract;

calculating with a processor a second liquidity factor of said rolling contract; and reweighting said commodity based on said second liquidity factor of said commodity.

21. The computer readable medium of claim 20, wherein incrementally rolling said expiring contract is performed over a period, said period defined by a user.

22. The computer readable medium of claim 20, wherein incrementally rolling said expiring contract comprises: selling on a first day a first portion of an expiring contract and purchasing a corresponding first portion of said later dated contract; and selling on a second day a second portion of said expiring contract and purchasing a corresponding second portion of said later dated contract;

wherein reweighting said commodity based on said second liquidity factor of said commodity is based on a price of said expiring contract on said second day and a price of said later dated contract on said second day.

23. The computer readable medium of claim 20, wherein said expiring contract is defined by a user.

24. The computer readable medium of claim 13, wherein said calculated liquidity of each of said plurality of commodities is based on a trading volume of a contract for each of said plurality of commodities over a trailing period.

* * * * *